United States Patent
da Fonte Lopes da Silva et al.

(10) Patent No.: US 12,494,912 B2
(45) Date of Patent: Dec. 9, 2025

(54) ONE-TIME-USE SECRET BOOTSTRAPPING IN CONTAINER-ORCHESTRATED ENVIRONMENTS

(71) Applicant: Hewlett-Packard Development Company, L.P., Spring, TX (US)

(72) Inventors: Rafael da Fonte Lopes da Silva, Porto Alegre (BR); Natalia Machado dos Santos, Porto Alegre (BR); Mauricio Coutinho Moraes, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 530 days.

(21) Appl. No.: 17/797,458

(22) PCT Filed: Mar. 4, 2020

(86) PCT No.: PCT/US2020/020922
§ 371 (c)(1),
(2) Date: Aug. 4, 2022

(87) PCT Pub. No.: WO2021/177954
PCT Pub. Date: Sep. 10, 2021

(65) Prior Publication Data
US 2023/0078967 A1 Mar. 16, 2023

(51) Int. Cl.
*H04L 9/32* (2006.01)
*H04L 67/104* (2022.01)

(52) U.S. Cl.
CPC .......... *H04L 9/3228* (2013.01); *H04L 9/3213* (2013.01); *H04L 67/1044* (2013.01)

(58) Field of Classification Search
CPC .. H04L 9/3228; H04L 9/3213; H04L 67/1044
See application file for complete search history.

(56) References Cited

U.S. PATENT DOCUMENTS 9,851,968 B2 12/2017 Straub
10,013,668 B2 7/2018 Straub
(Continued)

OTHER PUBLICATIONS

Gross, T., "Secrets management in the Autopilot Pattern", Jan. 26, 2017, Retrieved at https://www.joyent.com/blog/secrets-management-in-the-autopilotpattern, 7 pages.

*Primary Examiner* — Rupal Dharia
*Assistant Examiner* — Devin E Almeida
(74) *Attorney, Agent, or Firm* — Quarles & Brady LLP

(57) ABSTRACT

An example system includes a one-time-use secret (OTUS) deployer engine to: provide an OTUS within a container-orchestrated environment (COE). The example system further includes: a non-OTUS provider engine to: provide a non-OTUS in exchange for the OTUS; and, invalidate the OTUS when the non-OTUS is provided. The example system further includes: a first container engine to: in response to bootstrapping, receive the OTUS from the OTUS deployer engine; and receive the non-OTUS from the non-OTUS provider engine in exchange for the OTUS. The example system further includes: a replica of the first container engine, to: in response to bootstrapping, after the first container engine, receive the OTUS from the OTUS deployer engine; attempt to receive the non-OTUS from the non-OTUS provider engine in exchange for the OTUS; receive an indication from the non-OTUS provider engine that the OTUS is invalid; and receive the non-OTUS from the first container engine.

20 Claims, 6 Drawing Sheets

(56) References Cited

U.S. PATENT DOCUMENTS

| | | | |
|---|---|---|---|
| 10,127,401 B2 | 11/2018 | Stuntebeck et al. | |
| 10,831,399 B2* | 11/2020 | Bett | G06F 9/5077 |
| 10,938,641 B1* | 3/2021 | Fritz | H04L 63/04 |
| 11,354,060 B2* | 6/2022 | Jayaraman | G06F 9/45545 |
| 11,416,587 B1* | 8/2022 | den Hartog | G06F 21/53 |
| 2011/0126207 A1* | 5/2011 | Wipfel | G06F 9/45533 |
| | | | 718/104 |
| 2014/0380441 A1 | 12/2014 | Stauth et al. | |
| 2017/0116424 A1* | 4/2017 | Aamir | G06F 21/606 |
| 2018/0196654 A1 | 7/2018 | Bo et al. | |
| 2018/0227182 A1 | 8/2018 | Patton et al. | |
| 2018/0314598 A1* | 11/2018 | Nanivadekar | G06F 11/1464 |
| 2019/0065323 A1* | 2/2019 | Dhamdhere | G06F 11/1484 |
| 2019/0146816 A1 | 5/2019 | Reno et al. | |

* cited by examiner

ONE-TIME-USE SECRET BOOTSTRAPPING IN CONTAINER-ORCHESTRATED ENVIRONMENTS

BACKGROUND

Container-orchestrated environment (COE) include cloud-based environments where containerized applications are deployed and/or scaled.

BRIEF DESCRIPTION OF THE DRAWINGS

Reference will now be made, by way of example only, to the accompanying drawings in which.

DETAILED DESCRIPTION

Figure 1:
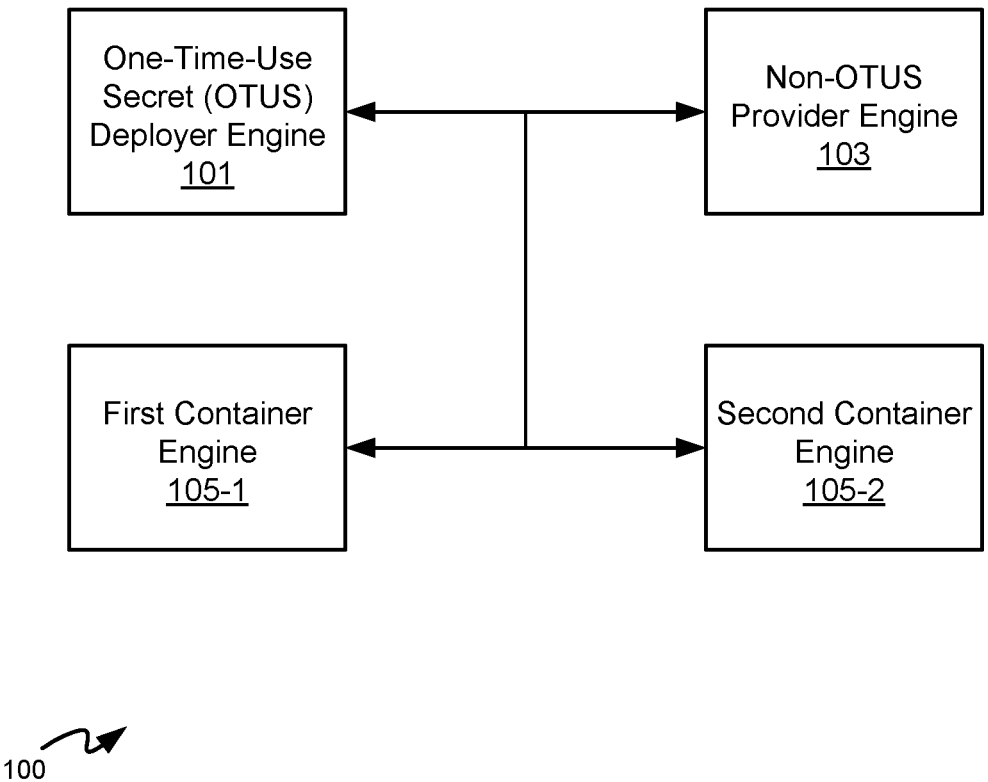
FIG. 1 is a block diagram of an example system to implement one-time-use secret bootstrapping in container-orchestrated environments.

Providing access to new one-time-use secrets for replicas of containers (e.g. containerized applications) in a container-orchestrated environment (COE) is challenging. In general, a COE may include a system and/or infrastructure providing automated deployment, scaling, and management of containerized applications (e.g., applications that run in containers). Capabilities of a COE may include automatically re-generating containers (e.g. to provide auto-scaling capability), which may be referred to as replicas. For example, a container that is deployed via a Continuous Delivery (CD) pipeline, may be managed by a COE. As part of the deployment process, the CD pipeline may provide a one-time-use secret (OTUS) to the container, and the container may use the OTUS to retrieve a renewable token, and the like, used in communications with other devices and/or services used to run the containerized application of the container. In general, containers of a COE generally obtain a renewable token, and the like, when bootstrapping.

Hence, the replicas may require fresh new OTUSs, for example when bootstrapping, to retrieve the renewable token; while the OTUSs may be provided by the CD pipeline, this adds to the overhead in deploying the replicas. Similarly, if a COE were to be adapted to provide better integrated support for continuous generation of new OTUSs as part of its management operations, doing so may dramatically increase overhead of processing resources and/or cost of running the COE. Put another way, when replicas of the containers are generated, and perform bootstrapping, to provide redundancy and/or autoscaling for a containerized application, a COE generally does not provide integrated support for continuous generation of new OTUSs as part of its management operations; hence delays in getting the replicas up and running may occur, which may jeopardize life-cycle management of the containers.

Hence, an aspect of the present specification is directed to a system comprising: a one-time-use secret (OTUS) deployer engine to: provide an OTUS within a container-orchestrated environment (COE); a non-OTUS provider engine to: provide a non-OTUS in exchange for the OTUS; and, invalidate the OTUS when the non-OTUS is provided; a first container engine to: in response to bootstrapping, receive the OTUS from the OTUS deployer engine; and receive the non-OTUS from the non-OTUS provider engine in exchange for the OTUS; a second container engine, that is a replica of the first container engine, to: in response to bootstrapping, after the first container engine, receive the OTUS from the OTUS deployer engine; attempt to receive the non-OTUS from the non-OTUS provider engine in exchange for the OTUS; receive an indication from the non-OTUS provider engine that the OTUS is invalid; and receive the non-OTUS from the first container engine.

Another aspect of the present specification is directed to a method comprising: receiving, by a computing device, in response to bootstrapping at a first container in a container-orchestrated environment (COE), a one-time-use secret (OTUS) from an OTUS deployer; receiving, by the computing device, at the first container, a non-OTUS from a non-OTUS provider, in exchange for the OTUS, the OTUS becoming invalid in response to the exchange of the OTUS for the non-OTUS; receiving, by the computing device, in response to bootstrapping at a second container of the COE, the non-OTUS from the first container, rather than the non-OTUS provider, via a peer-to-peer network of the COE, the second container comprising a replica of the first container; and providing, by the computing device, at the first container and the second container, same application services, the same application services at least partially provided in conjunction with the non-OTUS.

Another aspect of the present specification is directed to a non-transitory computer-readable medium comprising instructions that, when executed by a processor, cause the processor to: receive, in response to bootstrapping, at a first container of a container-orchestrated environment (COE), a one-time-use secret (OTUS) from an OTUS deployer; receive, at the first container, a non-OTUS from a non-OTUS provider, in exchange for the OTUS, the OTUS becoming invalid in response to the exchange of the OTUS for the non-OTUS; store, by the first container, the non-OTUS at a first volatile memory; receive, in response to bootstrapping at a second container of the COE, the non-OTUS from the first container, rather than the non-OTUS provider, the second container comprising a replica of the first container; store, by the second container, the non-OTUS at a second volatile memory; and provide, at the first container and the second container, same application services of the COE, the same application services at least partially provided in conjunction with the non-OTUS.

FIG. 1 is a block diagram of an example system 100 to implement one-time-use secret bootstrapping in container-orchestrated environments (COEs). The system 100 may include a one-time-use secret (OTUS) deployer engine 101, a non-OTUS provider engine 103, a first container engine 105-1 and a second container engine 105-2 in communication with one another (e.g., as represented by arrows therebetween). For convenience, the first container engine 105-1 and the second container engine 105-2 will be interchangeably referred to hereafter, collectively, as the container engines 105 and, generically, as a container engine 105.

Furthermore, while only two container engines 105 are depicted, the system 100 may comprise more than two container engines 105 and/or any suitable number of container engines 105. Furthermore, as will be described below, while both container engines 105 are depicted, initially the first container engine 105-1 may be present in the system 100 without the second container engine 105-2, and the second container engine 105-2 may later be generated. Put another way, the second container engine 105-2 may be generated in the system 100 after the first container engine 105-1 is generated.

As used herein, the term "engine" refers to hardware (e.g., a processor, such as a central processing unit (CPU) an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as a microprocessor (e.g., a central processing unit, a graphics processing unit, etc.), a digital signal processor, a microcontroller, an application specific integrated circuit (ASIC), a Field Programmable Gate Array (FPGA), a programmable array logic (PAL), a programmable logic array (PLA), a programmable logic device (PLD), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware. Furthermore the engines described herein may be combined at a hardware element and/or hardware elements. Furthermore the engines described herein may be deployed in the "cloud" and functionality thereof may be distributed between more than one server and/or device and/or set of hardware.

For example, the OTUS deployer engine 101 may comprise hardware or a combination of software and hardware for implementing functionality to: provide an OTUS within a container-orchestrated environment. The OTUS deployer engine 101 may comprise a portion of a server which hosts the OTUS deployer engine 101. However, the OTUS deployer engine 101 may comprise hardware or a combination of software and hardware of any suitable computing device and/or more than one suitable computing device.

In general, the components of the system 100 may be components of a container-orchestrated environment and/or the services of the components are generally provided in conjunction with a container-orchestrated environment. For example, the container engines 105 are generally replicas of one another that may be generated by a COE engine (not depicted) for auto-scaling and/or redundancy in the system 100, with the container engines 105 comprising respective applications and/or containerized applications (e.g. applications that are components of a container in a COE) that provide a same service to other components (not depicted) of the system 100 and/or to components (also not depicted) external to the system 100. For example, the container engines 105 may provide web-based services to remote devices communicating with the container engines 105 via a network, such as the Internet, and the like; in particular, the container engines 105 may be accessible via browser applications implemented by the remote devices. The container engines 105 may be interchangeably referred to as containers and/or the container engines 105 are understood to implement containers in a COE.

Furthermore, the container engines 105, to provide their respective services, may generally rely on services provided by other components (not depicted) of the system 100; such other components may rely on, and/or require, secrets to provide such services, for example to verify that the container engines 105 are validated to access such services. Such a secret may include a renewable and/or multi-use access token, and the like, which is to be provided by a container engine 105 to a component when the container engine 105 requests a service therefrom. Such a renewable and/or multi-use access token, and the like, is referred to herein as a non-one-time-use secret (non-OTUS), described in more detail below.

In particular, containers in a COE generally procure and/or obtain a non-OTUS when bootstrapping and/or in response to bootstrapping. Put another way, and as will be described in more detail below, in response to bootstrapping the container engines 105 are understood to implement a mechanism for obtaining a non-OTUS, using an OTUS. Such a mechanism for obtaining a non-OTUS, using an OTUS is generally not implemented by the container engines 105 other than in response to bootstrapping. Details of such a mechanism are next described.

In particular, the non-OTUS provider engine 103 is to: provide a non-OTUS in exchange for the OTUS; and, invalidate the OTUS when the non-OTUS is provided. Put another way, the non-OTUS provider engine 103 may provide a given non-OTUS to a container engine 105 in exchange for a given OTUS one time, after which the non-OTUS provider engine 103 invalidates the given OTUS, such that subsequent requests from a container engine 105 to exchange the given OTUS for the non-OTUS results in a failure, and/or the non-OTUS provider engine 103 providing a HyperText Transfer Protocol (HTTP) "403" type "forbidden" response status code to the container engine 105 attempting the exchange. Furthermore, the non-OTUS provider engine 103 may provide non-OTUSs to a container engine 105 with a time and/or date (and the like), of generation, referred to hereafter as a generation time.

Hence, assuming, in the depicted example, that the first container engine 105-1 is a first container to be generated in the system 100 (e.g. initially the second container engine 105-2 has not yet been generated and/or initially there are no replicas of the first container engine 105-1 in the system 100), the first container engine 105-1 is to: in response to bootstrapping, retrieve and/or receive an OTUS from the OTUS deployer engine 101; and retrieve and/or receive a non-OTUS from the non-OTUS provider engine 103 in exchange for the OTUS. For example, the first container engine 105-1 may in response to bootstrapping retrieve the OTUS from the OTUS deployer engine 101 and/or another component of the system 100, such as a COE and/or the OTUS deployer engine 101 may be to determine that the first container engine 105-1 is bootstrapping and cause the OTUS deployer engine 101 to provide and/or transmit the OTUS to the first container engine 105-1.

The first container engine 105-1 may store the non-OTUS, for example in association with a generation time received therewith. In some examples, for added security, the first container engine 105-1 stores the non-OTUS (e.g. with the generation time) at a volatile memory and/or a non-persistent memory, rather than a non-volatile memory and/or a persistent memory, such that the non-OTUS may not be read from a hard-drive, and the like.

Assuming, in the depicted example, that the second container engine 105-2 is a replica of the first container engine 105-1 (e.g. after the first container engine 105-1 is generated, the second container engine 105-2 is generated in the system 100 as a replica of the first container engine 105-1 to auto-scale services of the container engines 105), the second container engine 105-2 is to, in response to bootstrapping, after the first container engine 105-1, retrieve and/or receive the OTUS from the OTUS deployer engine 101 (e.g. the same OTUS as received by the first container engine 105-1); attempt to retrieve and/or receive the non-OTUS (e.g. the same non-OTUS as received by the first container engine 105-1) from the non-OTUS provider engine 103 in exchange for the OTUS; receive an indication (e.g. a "403" HTTP status code, and the like) from the non-OTUS provider engine 103 that the OTUS is invalid; and receive the non-OTUS from the first container engine 105-1.

Hence, the second container engine 105-2 obtains the non-OTUS from the first container engine 105-1 rather than the non-OTUS provider engine 103. Furthermore, the second container engine 105-2 obtains the non-OTUS from the first container engine 105-1 in any suitable manner; for example, the second container engine 105-2 may in response to bootstrapping retrieve the OTUS from the second container engine 105-2 and/or another component of the system 100, such as a COE and/or the OTUS provider engine 103 may be to determine that the second container engine 105-2 is bootstrapping and cause the OTUS provider engine 103 to provide and/or transmit the OTUS to the second container engine 105-2.

Hereafter, references to a container engine 105, and the like, receiving an OTUS and/or a non-OTUS from a particular component may include the container engine 105, and the like, retrieving the OTUS and/or the non-OTUS from the particular component, and the particular component providing the OTUS and/or the non-OTUS to container engine 105 in any suitable manner.

In some examples, the container engines 105 may form a peer-to-peer network, and/or the container engines 105 may be nodes and/or peers of a peer-to-peer network, and the non-OTUS may be distributed between the container engines 105 via the peer-to-peer network. Furthermore, in some examples, for added security, like the first container engine 105-1, the second container engine 105-2 stores the non-OTUS (e.g. with the generation time) at a respective volatile memory and/or a non-persistent memory, rather than a non-volatile memory and/or a persistent memory, such that the non-OTUS may not be read from a hard-drive, and the like.

Regardless, when one container engine 105 initially obtains an OTUS from the OTUS deployer engine 101, and exchanges the OTUS for a non-OTUS from the non-OTUS provider engine 103, the one container engine 105 may provide and/or distribute the non-OTUS to replicas of the one container engine 105 within the system 100.

Furthermore, while a particular mechanism for the container engines 105 obtaining a non-OTUS from other container engines 105 has been described (e.g. the second container engine 105-2 may request the non-OTUS from the first container engine 105-1), other mechanisms for distributing a non-OTUS to container engines 105 from other container engines 105 are within the scope of present examples including, but not limited to, a broadcast of a non-OTUS on a peer-to-peer network. For example, when a new container engine 105 is generated and the mechanism for obtaining the non-OTUS from the non-OTUS provider engine 103 fails, in response to the failure, the new container engine 105 may obtain the non-OTUS via another container engine 105 broadcasting the non-OTUS (e.g. and which may include a validation of the new container engine 105, for example via a validation of an address of the new container engine 105, as described in more detail below).

It is further understood, from the above description, that the container engines 105 obtain the OTUS from the OTUS deployer engine 101 in response to bootstrapping and/or when a container engine 105 bootstraps. Bootstrapping may generally refer to a process implemented at a container engine 105 when a container engine 105 first starts up and/or resets to become functional; the term bootstrapping may interchangeably be referred to as booting, and the like.

In some examples, the container engines 105 and/or any other suitable components of the system 100, may communicate using suitable applications programming interfaces (API) with information exchanged therebetween formatted accordingly. However, the components of the system 100 may communicate in any suitable manner.

While not depicted, the system 100 may comprise other components and/or engines including, but not limited to a COE engine. Such a COE engine may be to generally manage the container engines 105 including, but not limited to generating replicas of the container engines 105 and/or killing replicas of the container engines 105.

For example, the COE engine may be to generate a third container engine that is a replica of the existing container engines 105 to further provide auto-scalability and/or redundancy for the system 100. The third container engine may have similar functionality as the second container engine 105-2 such that an attempt to exchange the OTUS for the non-OTUS using the non-OTUS provider engine 103 generally fails; rather, the third container engine obtains the non-OTUS from previously generated container engines 105, as described above with respect to the second container engine 105-2 and/or in a peer-to-peer network, and the like. Put another way, the system 100 may further comprise a third container engine, that is a respective replica of the first container engine 105-1 and the second container engine 105-2, the third container engine to: in response to bootstrapping, after the first container engine 105-1, receive the OTUS from the OTUS deployer engine 101 (e.g. the same OTUS retrieved by the first container engine 105-1, which has expired at the non-OTUS provider engine 103); attempt to receive the non-OTUS from the non-OTUS provider engine 103 in exchange for the OTUS; receive a respective indication from the non-OTUS provider engine 103 that the OTUS is invalid; and receive the non-OTUS from the first container engine 105-1 or the second container engine 105-2.

Indeed, the COE engine may be to generate any suitable number of additional container engines with similar functionality as the third container engine. Furthermore, a container engine 105 that is generated after the first container engine 105-1, and that is a replica thereof, may obtain the non-OTUS, in response to bootstrapping, from any existing and/or previously generated replicas of the container engines 105 in any suitable manner.

In some examples, the COE engine may be further to provide the replicas of the container engines 105 with addresses and/or network addresses and/or Internet Protocol (IP) addresses and/or peer addresses of the other replicas of the container engines 105, to facilitate communication between the container engines 105 (e.g. when a non-OTUS is provided therebetween) and/or such that the container engines 105 may form a peer-to-peer network. Put another way, the COE engine may be to: provide respective peer-to-peer addresses of replicas of the first container engine 105-1 to all the replicas of the first container engine 105-1, the non-OTUS being shared between the replicas in a peer-to-peer network via the respective peer-to-peer addresses. Put yet another way, the COE engine may be to: provide respective peer-to-peer addresses of replicas of the container engines 105 to all the replicas of the container engines 105, the non-OTUS being shared between the replicas of the container engines 105 in a peer-to-peer network via the respective peer-to-peer addresses.

In yet further examples, a peer-to-peer network may be formed via a peer-to-peer service implemented by the COE and/or the COE engine and/or by a peer-to-peer service engine. For example, the container engines 105 may be provided with an address of a peer-to-peer service engine (e.g. rather than the addresses of the other container engines 105); the peer-to-peer service engine may be provided with addresses of the other container engines 105 (e.g. by the COE engine). Hence, the container engines 105 may broadcast a non-OTUS by transmitting the non-OTUS to the peer-to-peer service engine, which in turn transmits the non-OTUS to the other container engines 105. Alternatively, a newly generated container engine 105 may request a non-OTUS from previously generated container engines 105 by transmitting a request to the peer-to-peer service engine, which in turn transmits the request to previously generated container engines 105; similarly, a previously generated container engine 105 may, in response to receiving the request, transmit the non-OTUS to the newly generated container engine 105 via the peer-to-peer service engine.

The COE engine may further be to: coordinate the OTUS and the non-OTUS between the OTUS deployer engine 101 and the non-OTUS provider engine 103. For example, in response to the OTUS deployer engine 101 generating an OTUS, the COE engine may communicate with the OTUS deployer engine 101 and the non-OTUS provider engine 103 to facilitate an association between the OTUS and a non-OTUS generated by the non-OTUS provider engine 103, such that the non-OTUS provider engine 103 is configured to associate a non-OTUS with the OTUS, and invalidate the OTUS in response to an associated non-OTUS being deployed one time.

Hence, in particular, an OTUS of the system 100 is understood to be usable only one time, an OTUS comprising: a one-time-use password; or a one-time-use token; or a non-renewable access token; or a one-time use security token; or a one-time use credential; or a one-time use cryptographic key; and, the like. Hence, the OTUS deployer engine 201 is to generate such an OTUS.

Similarly, a non-OTUS of the system 100 is understood to be usable more than one time, a non-OTUS for use in communicating with components that use secrets to provide services, as described above, the non-OTUS comprising: a multiple-use password; or a multiple-use token; or a renewable access token; or a multiple-use security token; or a multiple-use credential; or a multiple-use cryptographic key. Hence, the non-OTUS provider engine 203 is generally to generate such a non-OTUS. As such, the non-OTUS may be provided to such components that use secrets to provide services, for example by the COE engine.

In some examples, when a non-OTUS expires, the associated OTUS also expires and the components of the system 100, that use secrets to provide services, may be provided with a new non-OTUS; as such, the container engines 105 should obtain the new non-OTUS to continue receiving services from such components. A non-OTUS may expire in response to timeout, in response to an administrator of the system 100 invalidating the non-OTUS (e.g. due to a leak of the non-OTUS), and the like.

However, as the container engines 105 generally do not attempt to obtain a non-OTUS except upon bootstrapping, the COE may provide a mechanism for distributing a new non-OTUS to the container engines 105. One example mechanism for the container engines 105 obtaining a new non-OTUS is as follows. The COE engine may be to: in response to a non-OTUS expiring, kill one of the first container engine 105-1 and the second container engine 105-2; and generate a third container engine (and/or a new container engine 105 when there are more than two container engines 105 present in the system 100) that is a replica of the first container engine 105-1 and the second container engine 105-2. Such a third container engine (and/or new container engine 105) may be different from the third container engine previously described (e.g. which was generated before a non-OTUS expires). Such a third container engine (and/or new container engine 105) may be to: in response to bootstrapping, receive a new OTUS from the OTUS deployer engine 101; receive a new non-OTUS from the non-OTUS provider engine 103 in exchange for the new OTUS; and provide the new non-OTUS to remaining replicas of the first container engine 105-1 and the second container engine 105-2. The new non-OTUS may be received at the third container engine (and/or new container engine 105) with a new generation time, that is later than the generation time of the previous non-OTUS.

Put another way, the third container engine (and/or new container engine 105) includes functionality similar to the previously generated container engines 105, however, when the third container engine (and/or new container engine 105) requests an OTUS from the OTUS deployer engine 101, a new OTUS is received therefrom, which has not expired, and hence the third container engine (and/or new container engine 105) may exchange the new OTUS for the new non-OTUS from the non-OTUS provider engine 103. The third container engine (and/or new container engine 105) may distribute the new non-OTUS to the remaining container engines 105 via a peer-to-peer network, as described above. In some examples, the third container engine (and/or new container engine 105) may broadcast the new non-OTUS to the remaining container engines 105 in the peer-to-peer network, along with the new generation time. When the new non-OTUS is received at the remaining container engines 105, the remaining container engines 105 overwrite the previous (expired) non-OTUS with the new non-OTUS as the new generation time is later than the old generation time. Put another way, the container engines 105 are generally to: overwrite an older non-OTUS with a newer non-OTUS; and/or the container engines 105 are generally to: in response to receiving a new non-OTUS and/or a current non-OTUS, discard an older non-OTUS and/or a previous non-OTUS.

However, while a particular mechanism for distributing a new non-OTUS to the container engines 105 is described, the components of the COE may be adapted for any suitable mechanism for distributing a new non-OTUS to the container engines 105. For example, a non-OTUS may be associated with an expiry time, and the like. The container engines 105 may be to: prior to a current non-OTUS expiring, proactively use the current non-OTUS to obtain a new non-OTUS from the non-OTUS provider engine 103; for example a current non-OTUS may be communicated to the non-OTUS provider engine 103, by container engine 105, as a verification that the container engine 105 is authorized to use a non-OTUS provided by the non-OTUS provider engine 103, and the non-OTUS provider engine 103 may responsively provide the container engine 105 with a new non-OTUS having a later expiry time than the current non-OTUS. Put another way, a container engine 105 may exchange an unexpired current non-OTUS for a new non-OTUS having a later expiry time than the current non-OTUS. Alternatively, the container engines 105 may renew a current non-OTUS with the non-OTUS provider engine 103 and/or the COE engine, to increase the life of a session using the current non-OTUS in which the container engines 105 use the current non-OTUS to communicate with components that use secrets to provide services; in such examples, it is understood that the components of the system 100 and/or the COE are generally enabled to renew a non-OTUS.

While broadcasting a non-OTUS is one mechanism for distributing a non-OTUS, other mechanisms are within the scope of the present specification. For example, in response to a communication failing with a component, that uses a secret to provide a service, when a current non-OTUS is used for the communication, a container engine 105 may request a new non-OTUS from other container engines 105 of the system 100 (e.g. and/or of a peer-to-peer network); when another container engine 105 has obtained a new non-OTUS, as described above, the other container engine 105 may provide the new non-OTUS to the requesting container engine 105.

In some examples, the container engines 105 may be further to implement a security mechanism to validate one another when a non-OTUS is provided between container engines 105. For example, a container engine 105 may request a non-OTUS (e.g. a requesting container engine 105), from another container engine 105 (e.g. a responding container engine 105), for example when an attempt to receive the non-OTUS from the non-OTUS provider engine 103, in exchange for the OTUS, fails, as described above. The requesting container engine 105 may request the non-OTUS using a respective network address, and the like. The responding container engine 105 may acknowledge the request, and communicate the network address of the requesting container engine 105 to the COE engine, and the like (e.g. via an applications programming interface (API) of a COE) to validate the requesting container engine 105. The COE engine may, for example, be further to maintain a list of valid addresses of container engines 105 within the COE. The COE engine may transmit a validation of the requesting container engine 105 to the responding container engine 105 which, in response to receiving the validation, transmits the non-OTUS to the requesting container engine 105.

However, any suitable validation process is within the scope of the present specification. For example, as described above, the COE engine may provide addresses of the container engines 105 to all the container engines 105 and hence a responding container engine 105 may validate an address of a requesting container engine 105 against the addresses received from the COE.

While the system 100 has been described with respect to one OTUS deployer engine 101 and one non-OTUS provider engine 103, the system 100 may include any suitable number of engines 101, 103. For example, the system 100 may include a respective OTUS deployer engine 101 and a respective non-OTUS provider engine 103 for the container engines 105 (e.g. managed by a COE engine), for example, when the container engines 105 are implemented on different cloud computing resources and/or servers (e.g. and/or the system 100 may comprise more than one OTUS deployer engine 101 and/or more than one non-OTUS provider engine 103 which provide services of subsets of the container engines 105). Put another way, the system 100 may comprise a respective OTUS deployer engine 101 and a respective non-OTUS provider engine 103 for the first container engine 105-1 and the second container engine 105-2.

Figure 2:
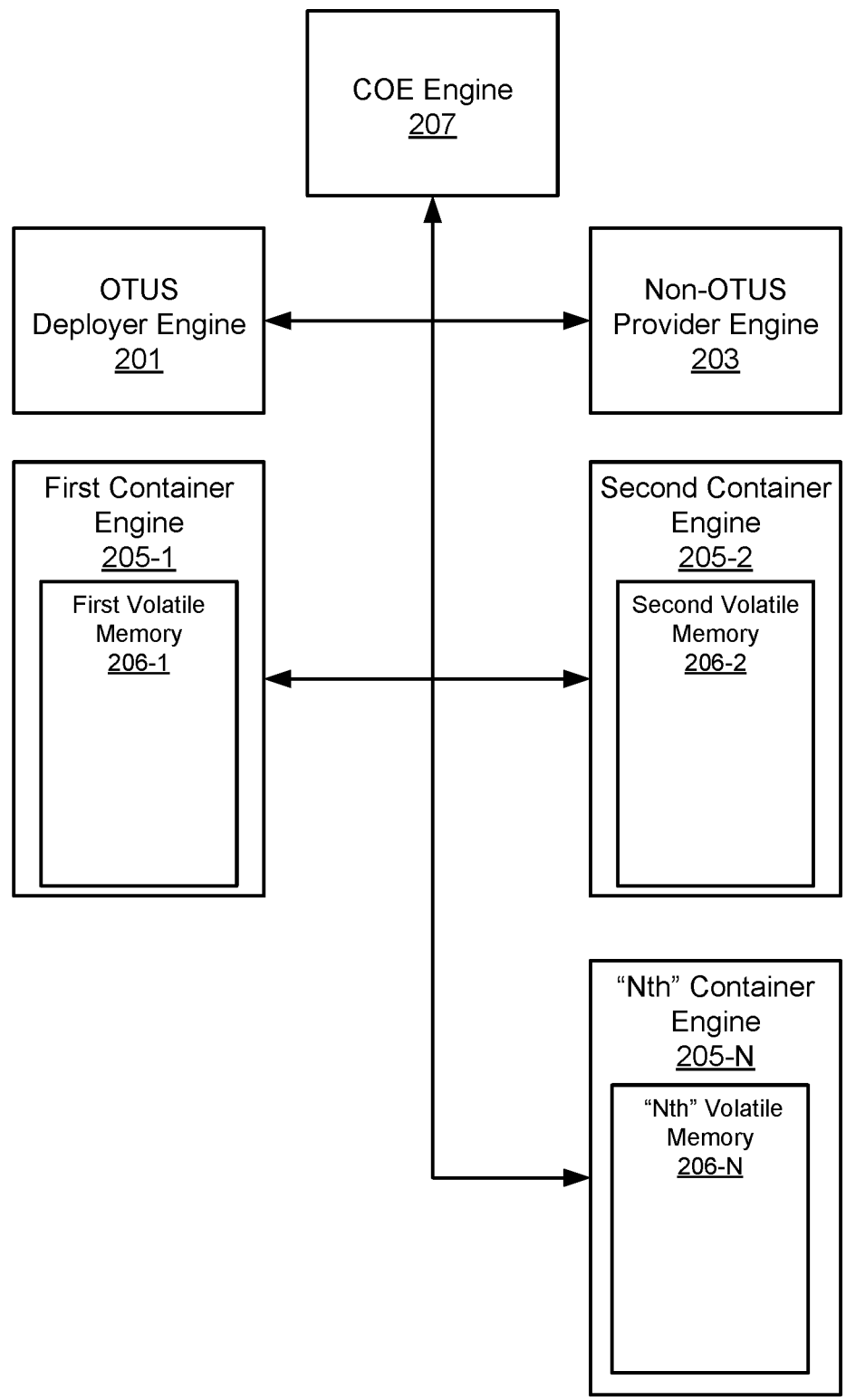
FIG. 2 is a block diagram of another example system to implement one-time-use secret bootstrapping in container-orchestrated environments.

Attention is next directed to FIG. 2 which is a block diagram of another example system 200 to implement one-time-use secret bootstrapping in container-orchestrated environments.

The system 200 is substantially similar to the system 100, with like components having like numbers, but in a "200" series rather than a "100" series. For example, the system 200 may include an OTUS deployer engine 201, a non-OTUS provider engine 203, a plurality of container engines 205-1, 205-2 . . . 205-N, including a first container engine 205-1, and a second container engine 205-2, in communication with one another (e.g., as represented by arrows therebetween). However, in contrast to the system 100, in the system 200 comprises an "N" number of container engines 205 including, but not limited to, as depicted an "Nth" container engine 205-N, where "N" is an integer number greater than "1". For convenience the container engines 205-1 . . . 205-N will be interchangeably referred to hereafter, collectively, as the container engines 205 and, generically, as a container engine 205.

Furthermore, the OTUS deployer engine 201, the non-OTUS provider engine 203, and the container engines 205 are respectively similar to the OTUS deployer engine 101, the non-OTUS provider engine 103, and the container engines 105, as described above.

In further contrast to the system 100, the system 200 further comprises a first volatile memory 206-1, associated with the first container engine 205-1, a second volatile memory 206-2, associated with the second container engine 205-2, and an "Nth" volatile memory 206-N, associated with the "Nth" container engine 205-N. For convenience the volatile memories 206-1 . . . 206-N will be interchangeably referred to hereafter, collectively, as the volatile memories 206 and, generically, as a volatile memory 206. In particular, the container engines 205 are associated with a respective volatile memory 206.

While as depicted a volatile memory 206 is a component of a respective container engine 205, in other examples, a volatile memory 206 may be external to, and in communication with, a respective container engine 205. Furthermore, while as depicted the volatile memories 206 are distinct from one another, the volatile memories 206 may be located at a volatile memory and/or volatile memories that are shared, and/or partially shared, between the container engines 205.

Regardless, in response to a container engine 205 receiving a non-OTUS, as described above, the container engine 205 stores the non-OTUS at a respective volatile memory 206 rather than at a non-volatile (and/or persistent) memory.

As described above, the first container engine 205-1 may be to, in response to bootstrapping, receive an OTUS from the OTUS deployer engine 201; receive a non-OTUS from the non-OTUS provider engine 203 in exchange for the OTUS, the OTUS becoming invalid in response to the exchange of the OTUS for the non-OTUS. Furthermore, the first container engine 205-1 may store the non-OTUS at the first volatile memory 206-1.

As subsequent container engines 205 are generated (e.g. the container engines 205-2 . . . 205-N, though the system 200 may comprise as few as two container engines 205 (e.g. N may equal 2)), the subsequent container engines 205 may be to: receive, in response to bootstrapping at a subsequent container engine 205, the non-OTUS from the first container engine 205-1 (and/or another previously generated container engine 205), rather than the non-OTUS provider engine 203, subsequent container engines 205 comprising respective replicas of the first container engine 205-1 (and/or another previously generated container engine 205); and store, by the subsequent container engine 205, the non-OTUS at a respective volatile memory 206. In general, after the non-OTUS is received at a container engines 205, the container engines 205 provide same application services of a COE, the same application services at least partially provided in conjunction with the non-OTUS, as described above (e.g. the non-OTUS is used to validate the container engines 205 with components that use secrets to provide respective services). As understood herein, the term "application services" may include any suitable services and/or data processing and/or consumption of data and/or functionality of a containerized application of the container engines 205 (and/or the container engines 105).

In further contrast to the system 100, the system 200 comprises a COE engine 207 to: coordinate an OTUS and a non-OTUS between the OTUS deployer engine 201 and the non-OTUS provider engine 203, as described above.

The COE engine 207 may be further to: in response to a non-OTUS expiring, kill one of container engines 205; and generate a new container engine 205 that is a replica of the remaining previously generated container engines 205, the new container engine 205 to: in response to bootstrapping, receive a new OTUS from the OTUS deployer engine 201; receive a new non-OTUS from the non-OTUS provider engine 203 in exchange for the new OTUS; and provide the new non-OTUS to the remaining previously generated container engines 205, similar to as described above. The COE engine 207 may further coordinate the new OTUS and the new non-OTUS between the OTUS deployer engine 201 and the non-OTUS provider engine 203, as described above. However, the system 200 and/or the container engines 205 may be adapted to exchange a current non-OTUS for a new non-OTUS at the non-OTUS provider engine 203, and/or renew a current non-OTUS as described above.

Indeed, the COE engine 207 may be to perform any of the functionality of the COE engine that was described with reference to the system 100.

Figure 3:
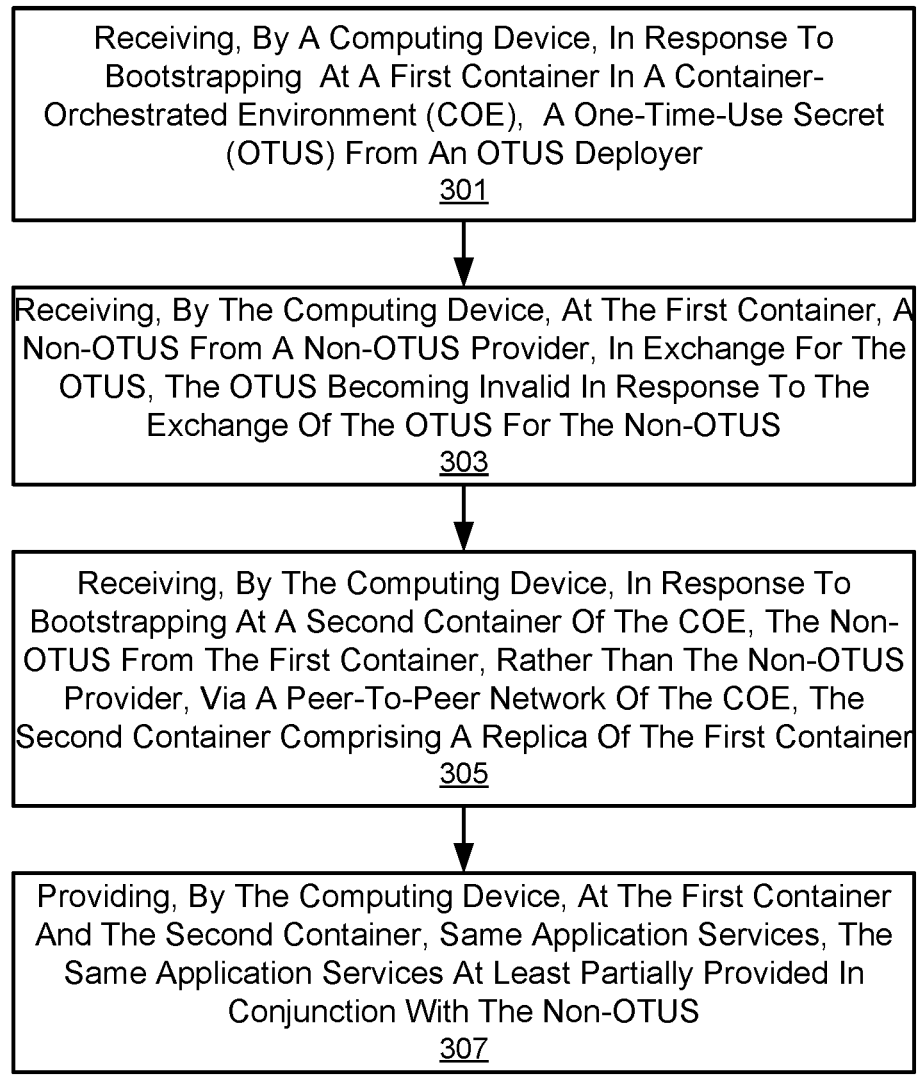
FIG. 3 is a flow diagram of an example method to implement one-time-use secret bootstrapping in container-orchestrated environments.

Referring to FIG. 3, a flowchart of an example method 300 to implement one-time-use secret bootstrapping in container-orchestrated environments is depicted. In order to assist in the explanation of method 300, it will be assumed that method 300 may be performed with the system 200, and at least partially by a computing device implementing the system 200 and/or a processor thereof. Indeed, the method 300 may be one way in which the system 200 may be configured. Furthermore, the following discussion of method 300 may lead to a further understanding of the system 200, and its various components. Furthermore, it is to be emphasized, that method 300 may not be performed in the exact sequence as shown, and various blocks may be performed in parallel rather than in sequence, or in a different sequence altogether. Furthermore, it is to be emphasized that the method 300 may alternatively be performed with the system 100, and at least partially by a computing device implementing the system 100 and/or a processor thereof.

Beginning at a block 301, a computing device receives (and/or retrieves), in response to bootstrapping at a first container (e.g. the first container engine 205-1) in a COE, an OTUS from an OTUS deployer (e.g. the OTUS deployer engine 201). It is understood that the block 301 may include the computing device generating the first container.

At a block 303, the computing device receives (and/or retrieves), at the first container, a non-OTUS from a non-OTUS provider (e.g. the non-OTUS provider engine 203), in exchange for the OTUS, the OTUS becoming invalid in response to the exchange of the OTUS for the non-OTUS.

In some examples, the block 303 of the method 300 may include the computing device, storing, via the first container, the non-OTUS at a volatile memory (e.g. the first volatile memory 206-1).

At a block 305, the computing device receives (and/or retrieves), in response to bootstrapping at a second container (e.g. the second container engine 205-2) of the COE, the non-OTUS from the first container, rather than the non-OTUS provider, via a peer-to-peer network of the COE, the second container comprising a replica of the first container. It is understood that the block 305 may include the computing device generating the second container.

It is further understood that the block 305 may include computing device: receiving (and/or retrieving), at the second container, the OTUS from the OTUS deployer; attempting to receive (and/or retrieve), at the second container, the non-OTUS from the non-OTUS provider in exchange for the OTUS; receiving, at the second container, an indication from the non-OTUS provider that the OTUS is invalid; and receiving, at the second container, the non-OTUS from the first container, for example in response to requesting, at the second container, the non-OTUS from the first container. Put another way, the block 305 of the method 300 may include the computing device, requesting at the second container, the non-OTUS from the first container, for example via the peer-to-peer network. In other examples, the block 305 of the method 300 may include the computing device, broadcasting, at the first container, the non-OTUS to other replicas of the first container, such as the second container, of the peer-to-peer network.

In some examples, the block 305 of the method 300 may include the computing device, storing, via the second container, the non-OTUS at a volatile memory (e.g. the second volatile memory 206-2).

At a block 307, the computing device provides, at the first container and the second container, same application services, the same application services at least partially provided in conjunction with the non-OTUS, as described above.

In some examples, the method 300 may further comprise the computing device receiving, in response to bootstrapping at a third container (e.g. and/or an "Nth" container) of the COE, the non-OTUS from the first container or the second container, rather than the non-OTUS provider engine 203, via the peer-to-peer network, the third container (e.g. and/or an "Nth" container) comprising a replica of the first container and the second container. It is understood that the computing device may generate the third container (e.g. and/or an "Nth" container). In these examples, the computing device provides, at the first container, the second container, and the third container (e.g. and/or an "Nth" container), the same application services, the same application services at least partially provided in conjunction with the non-OTUS, as described above. Indeed, the block 305 and the block 307 may be repeated for any suitable number of replicas of the first container (e.g. any suitable number of container engines 205); furthermore, in some of these examples, the method 300 may include the computing device broadcasting, at the first container and the second container, the non-OTUS to other replicas of the first container of the peer-to-peer network. Indeed, as further replicas of the containers (e.g. replicas of the container engines 205)

are generated at the system 200, the further replicas of the containers obtain the non-OTUS from previously generated existing containers, and that the further replicas of the containers, in response to receiving the non-OTUS, may also broadcast the non-OTUS.

Furthermore, as described above, the method 300 may include the containers, and/or replicas of the containers, sharing the non-OTUS in a peer-to-peer network. In some specific examples, sharing the non-OTUS in the peer-to-peer network, by replicas of the first container, may occur via a peer-to-peer service and/or a peer-to-peer service engine.

Figure 4:
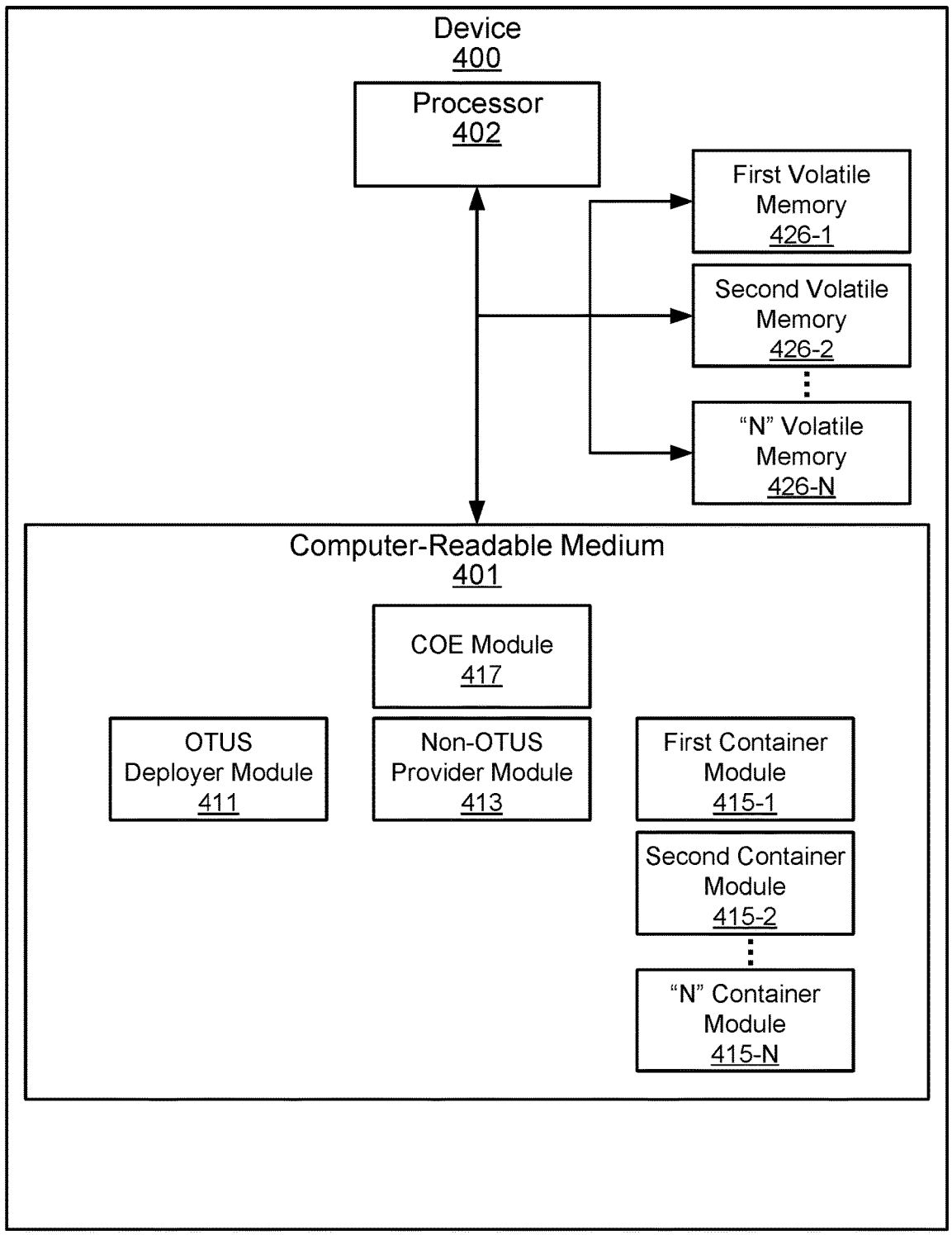
FIG. 4 is a block diagram of an example computer-readable medium including instructions that causes a processor to implement one-time-use secret bootstrapping in container-orchestrated environments.

FIG. 4 is a block diagram of an example device 400 that includes a computer-readable medium 401 and a processor 402. The computer-readable medium 401 includes instructions that, when implemented by the processor 402, cause the processor 402 to implement one-time-use secret bootstrapping in container-orchestrated environments.

The computer-readable medium 401 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like.

The processor 402 may be a general-purpose processor or special purpose logic, such as a microprocessor (e.g., a central processing unit, a graphics processing unit, etc.), a digital signal processor, a microcontroller, an ASIC, an FPGA, a PAL, a PLA, a PLD, etc. The computer-readable medium 401 or the processor 402 may be distributed among a plurality of computer-readable media or a plurality of processors.

The computer-readable medium 401 includes modules. As used herein, a "module" (in some examples referred to as a "software module") is a set of instructions that when implemented or interpreted by a processor or stored at a processor-readable medium realizes a component or performs a method.

As depicted, the computer-readable medium 401 includes: an OTUS deployer module 411, a non-OTUS provider module 413, a plurality of container modules 415-1, 415-2 . . . 415-N, including a first container module 415-1, a second container module 415-2, and an "Nth" container module 415-N, and a COE module 417.

As depicted, the example device 400 further includes a plurality of volatile memories 426-1, 426-2 . . . 426-N in a one-to-one relationship with the container modules 415. However, the volatile memories 426 may be combined into a plurality of volatile memories 426.

The OTUS deployer module 411 may include instructions that, when implemented, cause the processor 402 to: provide an OTUS within a COE, similar to as described with respect to the OTUS deployer engines 101, 201.

The non-OTUS provider module 413 may include instructions that, when implemented, cause the processor 402 to: provide a non-OTUS in exchange for an OTUS; and, invalidate the OTUS when the non-OTUS is provided, similar to as described with respect to the non-OTUS provider engines 103, 203.

The first container module 415-1 may include instructions that, when implemented, cause the processor 402 to: receive, in response to bootstrapping, of a COE, an OTUS from the OTUS deployer module 411; receive a non-OTUS from the non-OTUS provider module 413, in exchange for the OTUS, the OTUS becoming invalid in response to the exchange of the OTUS for the non-OTUS; and store the non-OTUS at the first volatile memory 426-1. It is understood that instructions of the first container module 415-1 cause the processor 402 to implement a first container.

The second container module 415-2 may include instructions that, when implemented, cause the processor 402 to: receive, in response to bootstrapping, the non-OTUS from the first container module 415-1, rather than the non-OTUS provider module 413, the second container module 415-2 comprising a replica of the first container module 415-1; and store the non-OTUS at the second volatile memory 416-2. It is understood that instructions of the second container module 415-2 cause the processor 402 to implement a second container.

The "Nth" container module 415-N may include instructions that, when implemented, cause the processor 402 to: receive, in response to bootstrapping, the non-OTUS from a previously generated container module 415, rather than the non-OTUS provider module 413, the container module 415-N comprising a replica of the first container module 415-1 and/or the second container module 415-2 and/or a previously generated container module 415; and store the non-OTUS at the "Nth" volatile memory 416-N. It is understood that instructions of the "Nth" container module 415-N cause the processor 402 to implement an "Nth" container.

The first container module 415-1 and the second container module 415-2 (e.g. and the "Nth" container module 415-N) may further include instructions that, when implemented, cause the processor 402 to: provide, via the first container module 415-1 and the second container module 415-2 (e.g. and via the "Nth" container module), same application services of the COE, the same application services at least partially provided in conjunction with the non-OTUS, as described above.

The COE module 417 may include instructions that, when implemented, cause the processor 402 to: generate and/or kill the container modules 415, for example for auto-scaling and/or redundancy in a COE.

In particular, COE module 417 may include instructions that, when implemented, cause the processor 402 to: in response to the non-OTUS expiring, kill one of the first container module 415-1 and the second container module 415-2 (e.g. and/or the "Nth" container module 415-N); generate a third container module 415 (and/or an "N+1" container module 415) of the COE that is a replica of the first container module 415-1 and the second container module 415-2 (e.g. and/or the "Nth" container module 415-N); receive, in response to bootstrapping at the third container module 415, a new OTUS from the OTUS deployer module 411; receive, at the third container module 415, a new non-OTUS from the non-OTUS provider module 413, in exchange for the new OTUS, the new OTUS becoming invalid in response to the exchange of the new OTUS for the new non-OTUS; store, by the third container module 415, the non-OTUS at a third volatile memory 426; provide, by the third container module 415, the new non-OTUS to remaining replicas in the COE; and overwrite, at remaining replicas, the non-OTUS with the new non-OTUS at respective volatile memories 426. Such functionality is similar to that of the COE engine described with reference to the system 100. However, the device 400 may be adapted to exchange a current non-OTUS for a new non-OTUS and/or renew a current non-OTUS as described above.

The COE module 417 may further include instructions that, when implemented, cause the processor 402 to: cause the OTUS and the non-OTUS to be available in association with one another at the non-OTUS provider module 413.

Furthermore, while present examples are described with respect to the computing device 400 comprising one OTUS deployer module 411 and one non-OTUS provider module 413, in other examples, the COE module 417 may further include instructions that, when implemented, cause the processor 402 to: provide a respective OTUS deployer module 411 and a respective non-OTUS provider module 413 for the first container module 415-1 and the second container module 415-2 (e.g. and the "Nth" container module 415-N). Put another way, the COE module 417 may further include instructions that, when implemented, cause the processor 402 to: provide a respective OTUS deployer module 411 and a respective non-OTUS provider module 413 for the container modules 415.

The COE module 417 may further include instructions that, when implemented, cause the processor 402 to: provide respective peer-to-peer addresses of replicas of the first container module 415-1 to all the replicas of the first container module 415-1, the non-OTUS being shared between the replicas in a peer-to-peer network via the respective peer-to-peer addresses. Put another way, COE module 417 may further include instructions that, when implemented, cause the processor 402 to: provide respective peer-to-peer addresses of replicas of the container modules 415 to all the replicas of the replicas of the container modules 415, the non-OTUS being shared between the replicas in a peer-to-peer network via the respective peer-to-peer addresses.

Figure 5:
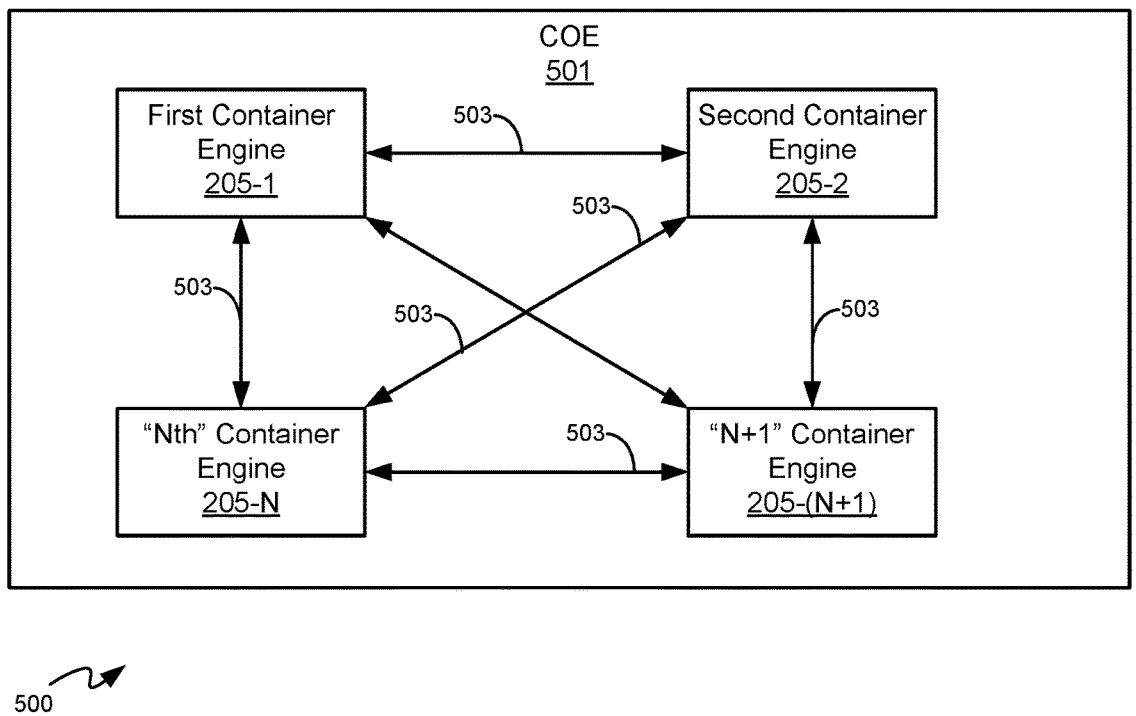
FIG. 5 is a block diagram of an example peer-to-peer network to implement one-time-use secret bootstrapping in container-orchestrated environments.

As has previously described, and with brief reference back to FIG. 2, the container engines 205 may form a peer-to-peer network and/or any containers and/or container engines 105, 205 described herein may form a peer-to-peer network. For example, attention is next directed to FIG. 5 which depicts a peer-to-peer network 500 formed in a COE 501. In particular communication links 503 are formed between container engines 205 (e.g. as depicted container engines 205-1, 205-2 . . . 205-N, 205-(N+1)) which may include, but is not limited to, any suitable type of communication link compatible with the COE 501. The communication links 503 may further include suitable APIs at the container engines 205. The non-OTUSs described herein may be exchanged between the container engines 205 via the communication links 503. The peer-to-peer network 500 may be formed in any suitable manner, for example using addresses of the container engines 205 and/or a peer-to-peer service engine, as described above (e.g. the communication links 503 may include a peer-to-peer service engine and/or the communication links 503 may be implemented via a peer-to-peer service engine).

Figure 6:
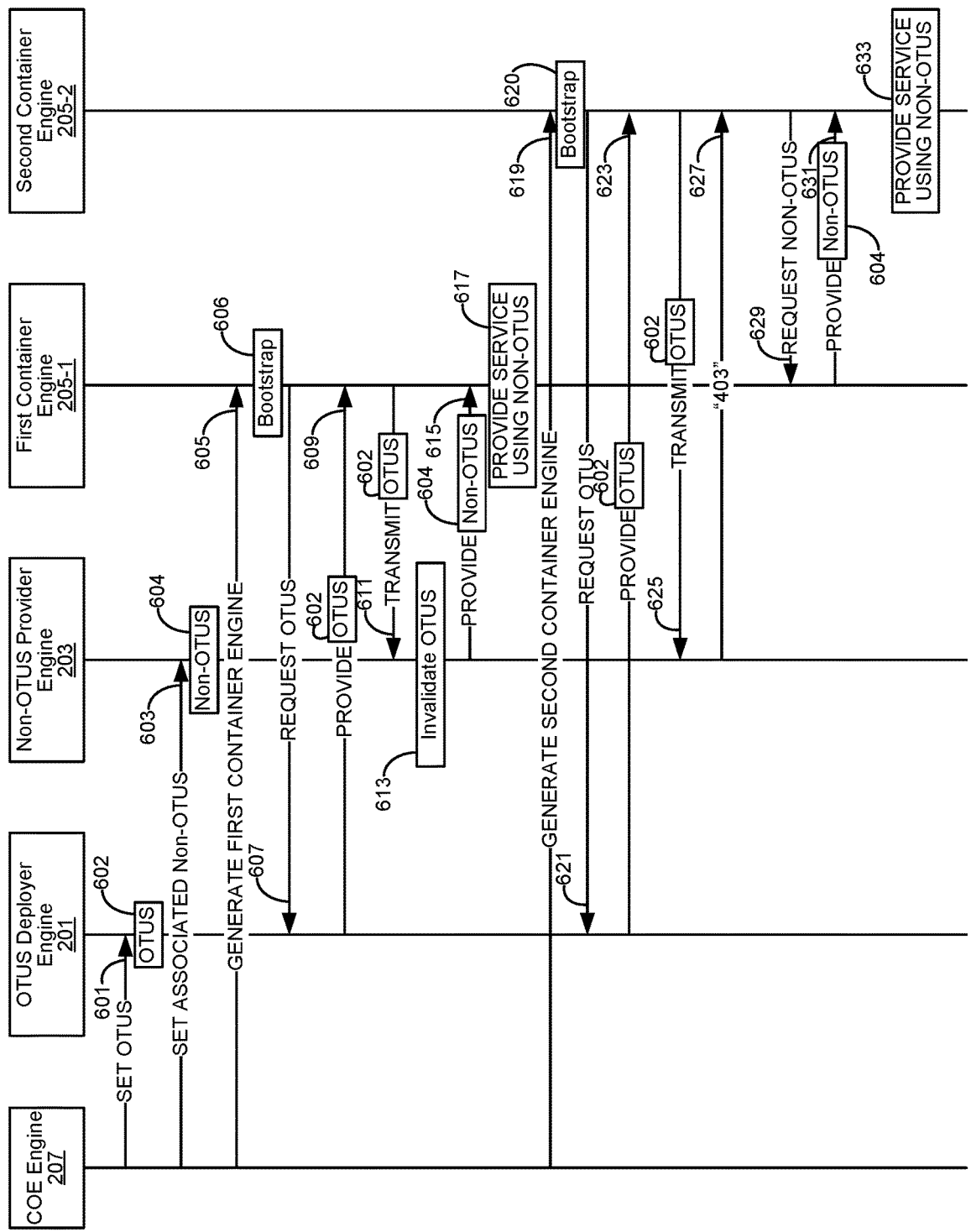
FIG. 6 is an example signal diagram showing components of the system of FIG. 2 implementing one-time-use secret bootstrapping in container-orchestrated environments.

Attention is next directed to FIG. 6 which is an example signal diagram showing components of the system of FIG. 2 implementing one-time-use secret bootstrapping in container-orchestrated environments.

As depicted, the COE engine 207 communicates 601 with the OTUS deployer engine 201 to cause the OTUS deployer engine 201 to set and/or generate an OTUS. In response, the OTUS deployer engine 201 generates an OTUS 602.

As depicted, the COE engine 207 further communicates 603 with the non-OTUS provider engine 203 to cause the non-OTUS provider engine 203 to set and/or generate a non-OTUS associated with the OTUS 602. In response, the non-OTUS provider engine 203 generates a non-OTUS 604 associated with the OTUS 602. In general, the engines 201, 203 to communicate and/or communication therebetween is facilitated via the COE engine 207, to cause the non-OTUS provider engine 203 to associate the non-OTUS 604 with the OTUS 602. In some examples, the OTUS deployer engine 201 may provide the OTUS 602 to the non-OTUS provider engine 203, and the non-OTUS provider engine 203 associates the non-OTUS 604 with the OTUS 602.

The COE engine 207 generates 605 the first container engine 205-1 (e.g. a first container and/or a first replica of a containerized application). The first container engine 205-1 bootstraps 606 and, in response to bootstrapping and/or as part of the bootstrapping process, the first container engine 205-1 requests 607 an OTUS from the OTUS deployer engine 201, which responsively provides 609 the OTUS 602 to the first container engine 205-1.

The first container engine 205-1, in response to receiving the OTUS 602, transmits 611 the OTUS 602 to the non-OTUS provider engine 203, to request an associated non-OTUS. The non-OTUS provider engine 203, in response to receiving the OTUS 602, invalidates 613 the OTUS 602 and provides 615 the non-OTUS 604 to the first container engine 205-1. The invalidation prevents the non-OTUS provider engine 203 from again providing the non-OTUS 604 in exchange for the OTUS 602, but does not prevent the OTUS deployer engine 201 from providing the OTUS 602. In particular, the non-OTUS provider engine 203 invalidates the OTUS 602 a first time the associated non-OTUS 604 is requested.

The first container engine 205-1 receives the non-OTUS 604 and provides 617 services, as described above, using the non-OTUS 604.

After the first container engine 205-1 is generated, the COE engine 207 generates 619 the second container engine 205-2 (e.g. a second container and/or a second replica of the containerized application). The second container engine 205-2 bootstraps 620 and, in response to bootstrapping and/or as part of the bootstrapping process, the second container engine 205-2 requests 621 an OTUS from the OTUS deployer engine 201; as the second container engine 205-2 is a replica of the first container engine 205-1, the OTUS deployer engine 201 which responsively provides 623 the OTUS 602 to the second container engine 205-2 (e.g. the OTUS deployer engine 201 provides the same OTUS to replicas of a same container).

The second container engine 205-2, in response to receiving the OTUS 602, transmits 625 the OTUS 602 to the non-OTUS provider engine 203, to request an associated non-OTUS. The non-OTUS provider engine 203, in response to receiving the OTUS 602, transmits 627 and indication (e.g. a "403" failure code) to the second container engine 205-2 to indicate that the OTUS 602 is invalid. As such, the second container engine 205-2 requests 629 a non-OTUS from the first container engine 205-1, which provides 631 the non-OTUS 604 to the second container engine 205-2.

The second container engine 205-2 receives the non-OTUS 604 and provides 633 services, as described above, using the non-OTUS 604.

It should be recognized that features and aspects of the various examples provided above may be combined into further examples that also fall within the scope of the present disclosure.

The invention claimed is:

1. A system comprising:
  a one-time-use secret (OTUS) deployer engine to: provide an OTUS within a container-orchestrated environment (COE);
  a non-OTUS provider engine to: provide a non-OTUS in exchange for the OTUS; and, invalidate the OTUS when the non-OTUS is provided;
  a first container engine to: in response to bootstrapping, receive the OTUS from the OTUS deployer engine; and receive the non-OTUS from the non-OTUS provider engine in exchange for the OTUS; and a second container engine, that is a replica of the first container engine, to: in response to bootstrapping, after the first container engine, receive the OTUS from the OTUS deployer engine; attempt to receive the non-OTUS from the non-OTUS provider engine in exchange for the OTUS; receive an indication from the non-OTUS provider engine that the OTUS is invalid; and receive the non-OTUS from the first container engine via a peer-to-peer network of the COE, wherein at least one of the first container engine or the second container engine is further to broadcast the non-OTUS to other replicas of the first container engine of the peer-to-peer network.

2. The system of claim 1, further comprising:
a COE engine to: in response to the non-OTUS expiring, kill one of the first container engine and the second container engine; and generate a third container engine that is a replica of the first container engine and the second container engine, the third container engine to: in response to bootstrapping, receive a new OTUS from the OTUS deployer engine; receive a new non-OTUS from the non-OTUS provider engine in exchange for the new OTUS; and provide the new non-OTUS to remaining replicas of the first container engine and the second container engine.

3. The system of claim 1, further comprising:
a third container engine, that is a respective replica of the first container engine and the second container engine, the third container engine to: in response to bootstrapping, after the first container engine, receive the OTUS from the OTUS deployer engine; attempt to receive the non-OTUS from the non-OTUS provider engine in exchange for the OTUS; receive a respective indication from the non-OTUS provider engine that the OTUS is invalid; and receive the non-OTUS from the first container engine or the second container engine.

4. The system of claim 1, further comprising:
a COE engine to coordinate the OTUS and the non-OTUS between the OTUS deployer engine and the non-OTUS provider engine.

5. The system of claim 1, wherein:
the OTUS is usable only one time, the OTUS comprising: a one-time-use password; or a one-time-use token; or a non-renewable access token; or a one-time use security token; or a one-time use credential; or a one-time use cryptographic key; and the non-OTUS is usable more than one time, the non-OTUS for use in communicating with components that use secrets to provide services, the non-OTUS comprising: a multiple-use password; or a multiple-use token; or a renewable access token; or a multiple-use security token; or a multiple-use credential; or a multiple-use cryptographic key.

6. The system of claim 1, wherein the second container engine is to receive the non-OTUS from the first container engine by:
in response to receiving the indication from the non-OTUS provider engine that the OTUS is invalid: requesting the non-OTUS from the first container engine and receiving the non-OTUS from the first container engine in response to the request.

7. The system of claim 1, further comprising:
a COE engine to re-generate the first container engine as the second container engine.

8. A method comprising:
receiving, in response to bootstrapping at a first container of a container-orchestrated environment (COE), a one-time-use secret (OTUS) from an OTUS deployer;

receiving, at the first container, a non-OTUS from a non-OTUS provider, in exchange for the OTUS, the OTUS becoming invalid in response to the exchange of the OTUS for the non-OTUS;

receiving, in response to bootstrapping at a second container of the COE, the non-OTUS from the first container, rather than the non-OTUS provider, via a peer-to-peer network of the COE, the second container comprising a replica of the first container;

providing, at the first container and the second container, same application services, the same application services at least partially provided in conjunction with the non-OTUS; and broadcasting, at at least one of the first container or the second container, the non-OTUS to other replicas of the first container of the peer-to-peer network.

9. The method of claim 8, further comprising:
receiving, in response to bootstrapping at a third container of the COE, the non-OTUS from the first container or the second container, rather than the non-OTUS provider, via the peer-to-peer network, the third container comprising a replica of the first container and the second container.

10. The method of claim 8,
wherein the broadcasting the non-OTUS includes broadcasting, at both of the first container and the second container, the non-OTUS to other replicas of the first container of the peer-to-peer network.

11. The method of claim 8, further comprising:
requesting, at the second container, the non-OTUS from the first container.

12. The method of claim 8, wherein sharing the non-OTUS in the peer-to-peer network, by replicas of the first container, occurs via a peer-to-peer service.

13. The method of claim 8, wherein receiving the non-OTUS from the first container includes:
attempting to receive, at the second container, the non-OTUS from the non-OTUS provider, in exchange for the OTUS;

receiving, at the second container, an indication that the OTUS is invalid from the non-OTUS provider; and requesting, at the second container, the non-OTUS from the first container.

14. The method of claim 8, wherein:
the OTUS is usable only one time, the OTUS comprising: a one-time-use password; or a one-time-use token; or a non-renewable access token; or a one-time use security token; or a one-time use credential; or a one-time use cryptographic key; and the non-OTUS is usable more than one time, the non-OTUS for use in communicating with components that use secrets to provide services, the non-OTUS comprising: a multiple-use password; or a multiple-use token; or a renewable access token; or a multiple-use security token; or a multiple-use credential; or a multiple-use cryptographic key.

15. A non-transitory computer-readable medium comprising instructions that, when executed by a processor, cause the processor to:
receive, in response to bootstrapping, at a first container of a container-orchestrated environment (COE), a one-time-use secret (OTUS) from an OTUS deployer;

receive, at the first container, a non-OTUS from a non-OTUS provider, in exchange for the OTUS, the OTUS becoming invalid in response to the exchange of the OTUS for the non-OTUS;

store, by the first container, the non-OTUS at a first volatile memory;

receive, via a peer-to-peer network of the COE and in response to bootstrapping at a second container of the COE, the non-OTUS from the first container, rather than the non-OTUS provider, the second container comprising a replica of the first container;

broadcast, by at least one of the first container or the second container, the non-OTUS to other replicas of the first container of the peer-to-peer network;

store, by the second container, the non-OTUS at a second volatile memory; and provide, at the first container and the second container, same application services of the COE, the same application services at least partially provided in conjunction with the non-OTUS.

16. The non-transitory computer-readable medium of claim 15, wherein the instructions, when executed, further cause the processor to:

in response to the non-OTUS expiring, kill one of the first container and the second container;

generate a third container of the COE that is a replica of the first container and the second container;

receive, in response to bootstrapping at the third container, a new OTUS from the OTUS deployer;

receive, at the third container, a new non-OTUS from the non-OTUS provider, in exchange for the new OTUS, the new OTUS becoming invalid in response to the exchange of the new OTUS for the new non-OTUS;

store, by the third container, the non-OTUS at a third volatile memory;

provide, by the third container, the new non-OTUS to remaining replicas in the COE; and overwrite, at remaining replicas, the non-OTUS with the new non-OTUS at respective volatile memories.

17. The non-transitory computer-readable medium of claim 15, wherein the instructions, when executed, further cause the processor to:

cause the OTUS and the non-OTUS to be available in association with one other at the non-OTUS provider.

18. The non-transitory computer-readable medium of claim 15, wherein the instructions, when executed, further cause the processor to:

provide a respective OTUS deployer and a respective non-OTUS provider for the first container and the second container.

19. The non-transitory computer-readable medium of claim 15, wherein the instructions, when executed, further cause the processor to:

provide respective peer-to-peer addresses of replicas of the first container to all the replicas of the first container, the non-OTUS being shared between the replicas of a peer-to-peer network via the respective peer-to-peer addresses.

20. The non-transitory computer-readable medium of claim 15, wherein the instructions, when executed, cause the processor to receive the non-OTUS from the first container by:

attempting to receive, at the second container, the non-OTUS from the non-OTUS provider, in exchange for the OTUS;

receiving, at the second container, an indication that the OTUS is invalid from the non-OTUS provider; and requesting, at the second container, the non-OTUS from the first container.

* * * * *